United States Patent [19]

Loftin et al.

[11] 4,440,649

[45] Apr. 3, 1984

[54] WELL DRILLING AND COMPLETION FLUID COMPOSITION

[75] Inventors: Royal E. Loftin; Adelina J. Son, both of Houston, Tex.

[73] Assignee: Halliburton Company, Duncan, Okla.

[21] Appl. No.: 343,620

[22] Filed: Jan. 28, 1982

[51] Int. Cl.³ .............................................. C09K 7/02
[52] U.S. Cl. .............................. 252/8.5 C; 252/8.55 R
[58] Field of Search ............ 252/8.5 A, 8.5 C, 8.55 R

[56] References Cited

U.S. PATENT DOCUMENTS

| | | | |
|---|---|---|---|
| 2,552,775 | 5/1951 | Fischer et al. | 252/8.5 |
| 3,017,351 | 1/1962 | Scott et al. | 252/8.5 |
| 3,086,937 | 4/1963 | Fischer | 252/8.5 |
| 3,720,610 | 3/1973 | Erasmus | 252/8.5 |
| 3,956,140 | 5/1976 | Nahm et al. | 252/8.5 |
| 4,142,595 | 3/1979 | Anderson et al. | 252/8.5 |
| 4,309,523 | 1/1982 | Engelhardt et al. | 252/8.5 X |

*Primary Examiner*—Herbert B. Guynn
*Attorney, Agent, or Firm*—Robert A. Kent; Thomas R. Weaver

[57] ABSTRACT

An improved well drilling and completion fluid composition which has excellent stability over a broad temperature range, has a low tubular goods corrosion rate, prevents the sloughing of clay-containing materials and is environmentally acceptable. The composition is comprised of water, a viscosity increasing agent, a fluid loss reducer and rheology stabilizer and one or more water-soluble clay-stabilizing organic salts.

2 Claims, No Drawings

WELL DRILLING AND COMPLETION FLUID COMPOSITION

A great variety of aqueous drilling and completion fluid compositions have been developed and used heretofore. Problems which have been commonly encountered in the use of such drilling and completion fluids are that when high temperatures are encountered, the fluids become unstable, i.e., the viscosity and other properties are lost or reduced, and when the fluids come into contact with water-sensitive clay-containing formations or strata, the clay-containing materials slough off the walls of the well bore into the fluids. The sloughing of formation materials into the drilling and completion fluids causes various problems including the contamination of the fluids and the loss of desired fluid properties.

Heretofore, the sloughing of clay-containing formation materials, e.g., water-sensitive shales, penetrated by well bores when contacted by aqueous drilling or completion fluids has been reduced by including potassium chloride or potassium hydroxide in the drilling or completion fluids. While aqueous fluids containing potassium chloride or potassium hydroxide are effective in reducing the swelling of clays and the sloughing of clay-containing materials when in contact therewith, a number of other problems are inherent in the use of such solutions.

Drilling fluids containing potassium chloride in the quantity required to provide sufficient potassium ion concentration to prevent clay swelling and sloughing of formation materials frequently have demonstrated unstable rheological and filtration control properties. The high chloride ion content also causes the fluids to be more corrosive to tubular goods in the well bore and creates disposal problems. In addition, high chloride ion levels in drilling and completion fluids make electric logs and other analytical procedures carried out therein more difficult to interpret.

The use of potassium hydroxide in lieu of potassium chloride brings about more stable drilling and completion fluids, but the quantity of potassium hydroxide that can be used must be limited to prevent the fluids from becoming excessively caustic and corrosive. The presence of hydroxyl ions in the fluids offsets the effectiveness of potassium ions therein because hydroxyl ions promote hydration of clays. Further, dispersants must normally be used in drilling or completion fluids containing potassium hydroxide which bring about the adverse result of dispersing cuttings in the fluids.

Other potassium compounds such as potassium carbonate and potassium bicarbonate have been utilized in well treatment fluids, but such compounds also cause the fluids to be unstable, etc.

By the present invention, an improved drilling and completion fluid is provided which can be weighted with solid weighting agents to obtain densities from about 8.5 to about 19 pounds per gallon, which has a high tolerance for solids and cement contamination, which is insensitive to salt water intrusion, which can be used at temperatures up to 450° F. without losing desired rheological properties, which has a low tubular goods corrosion rate, which prevents or reduces the sloughing of water-soluble clay-containing materials when in contact therewith and which is environmentally acceptable allowing the fluid to be readily disposed of without elaborate procedures being carried out for protecting the environment.

The drilling and completion fluid compositions of this invention are comprised of water, a viscosity increasing agent which also functions as a fluid loss reducer, a fluid loss reducing and rheology stabilizing agent and a clay-stabilizing agent, i.e., an agent which substantially prevents the sloughing of water-sensitive clay-containing materials contacted by the compositions, but which does not make the compositions highly corrosive or toxic. The compositions can optionally include solid weighting agents, additional rheology stabilizers and basic compounds for adjusting the pH of the composition to desired levels.

The water utilized in the compositions can be fresh water, brines or seawater and the viscosity increasing agent can be any of a variety of hydratable gelling agents which hydrate in the water used to increase the viscosity thereof. Examples of such viscosity increasing agents are xanthum gum, hydroxyethylcellulose, sepiolite clay, attapulgite, and montmorillonite clay. Of the foregoing, sepiolite clay and attapulgite clay are preferred in that they readily increase the viscosity of fresh water, brines and salt water and do not lose stability at high temperatures, i.e., such viscosity increasing agents are stable and maintain the viscosity of an aqueous composition over a temperature range up to about 450° F. The most preferred viscosity increasing agent for use in the compositions of this invention is sepiolite clay.

The fluid loss reducing and rheology stabilizing agent utilized in accordance with the present invention is selected from the group consisting of pregelatinized starch, vinylamide-vinylsulfonate terpolymer, hydroxyethylcellulose and mixtures thereof. If the drilling and completion fluid composition is to be subjected to temperatures below about 250° F., pregelatinized starch is preferred for its relatively low cost. When the composition is to be subjected to temperatures in the range of from about 250° F. up to about 450° F., vinylamide-vinylsulfonate terpolymer is preferred in that it retains its stability and effectiveness at such temperatures. As indicated, the fluid loss reducing and rheology stabilizing agent reduces fluid loss to permeable formations encountered in a well bore and functions to maintain the drilling or completion fluid rheological properties at a substantially constant level in spite of solids and cement contamination, salt water intrusion and high temperatures.

The vinylamide-vinylsulfonate terpolymer is available as a fine white granular solid and is prepared by reacting 2-acrylamido-2 methyl-3-propyl sodium sulfonate, vinylacetamide and acrylamide monomers to form a terpolymer thereof. The terpolymer is readily dissolvable in fresh water, salt water and seawater, and as mentioned above, the terpolymer remains stable and effective over broad pH and temperature ranges. The terpolymer and its synthesis are described in greater detail in West German Patent No. 2,931,897 dated Feb. 26, 1981, which is incorporated herein by reference and which corresponds to U.S. Pat. No. 4,309,523, issued Jan. 5, 1982.

The clay-stabilizing agent functions to prevent the hydration and swelling of clays and the resultant sloughing of clay-containing materials when in contact with the compositions. The clay-stabilizing agent utilized in accordance with the present invention is a water-soluble clay-stabilizing organic acid salt or mixture of salts having the general formula:

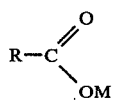

wherein: R is hydrogen or a methyl, ethyl or propyl radical; and M is potassium, rubidium, cesium or ammonium.

Such organic acid salts are readily soluble in water, brines and seawater and the cations thereof, i.e., potassium, rubidium, cesium and ammonium, react with or otherwise prevent water-sensitive clays from swelling and migrating. The anionic portions of the compounds are non-reactive with clays, are non-toxic and do not form insoluble compounds with cations normally present in subterranean formations such as sodium, calcium and magnesium. Examples of particularly suitable such compounds are potassium formate, potassium acetate, potassium propionate, potassium butyrate, rubidium formate, rubidium acetate, cesium formate, cesium acetate, ammonium formate, ammonium acetate, ammonium propionate, and ammonium butyrate.

Preferred such clay-stabilizing salts for use in accordance with the present invention are compounds as defined above wherein M is potassium. Of these, potassium acetate is the most preferred.

As mentioned above, the compositions preferably also include a base, such as sodium or potassium hydroxide present therein in a quantity sufficient to adjust the pH of the composition to a level in the range of from about 8.5 to about 11.5. At such pH range, the compositions are stable and relatively non-corrosive to metal tubular goods.

In addition, the compositions can optionally include a solid weighting agent, such as barite, hematite, etc., for increasing the density thereof to desired levels. The weighting agent can be present in the compositions in an amount such that the compositions have a density as high as 19 pounds per gallon while remaining stable, etc. When a weighting agent is included in the compositions it is also advantageous to include an additional rheology stabilizer therein which facilitates the dispersal and suspension of the weighting agent in the compositions. Particularly suitable such rheology stabilizers are the sodium salt of polymerized alkyl naphthalene sulfonic acid (polymerized alkyl naphthalene sodium sulfonate), citric acid and gluconic acid.

A particularly suitable drilling and completion fluid of the present invention is comprised of water, a viscosity increasing agent selected from the group consisting of sepiolite clay, and attapulgite clay present in the composition in an amount in the range of from about 1 to about 50 pounds per barrel of fluid, a fluid loss reducing and rheology stabilizing agent selected from the group consisting of pregelatinized starch, vinylamide-vinylsulfonate terpolymer and mixtures thereof present in the composition in an amount in the range of from about 1 to about 30 pounds per barrel of fluid, and a clay stabilizing agent comprised of a water-soluble organic acid salt selected from the group consisting of a salt or mixture of salts having the general formula:

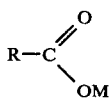

wherein: R is hydrogen or a methyl, ethyl or propyl radical, and M is potassium, rubidium, cesium or ammonium, the clay stabilizing agent being present in the composition in an amount in the range of from about 1 to about 100 pounds per barrel of fluid.

The above composition can include one or more weighting agents such as barite, hematite, etc., in an amount sufficient to increase the density thereof up to about 19 pounds per gallon, i.e., an amount in the range of from about 5 to about 600 pounds per barrel of fluid. As mentioned above, the composition can also include sodium or potassium hydroxide in an amount to adjust the pH to a level in the range of from about 8.5 to about 12.0, i.e., a quantity in the range of from about 0 to about 5 pounds per barrel of fluid and an additional rheology stabilizer, e.g., polymerized alkyl naphthalene sodium sulfonate, in a quantity in the range of from about 0 to about 5 pounds per barrel of fluid.

A preferred well drilling and completion fluid composition of this invention is comprised of water, sepiolite clay viscosity increasing agent present in the composition an amount in the range of from about 10 to about 30 pounds per barrel of composition, a fluid loss reducer and rheology stabilizer selected from the group consisting of pregelatinized starch, vinylamide-vinylsulfonate terpolymer and mixtures thereof present in said composition in an amount in the range of from about 1 to about 20 pounds per barrel of composition, a clay stabilizing agent comprised of a water-soluble organic acid salt selected from the group consisting of a salt or mixture of salts having the general formula:

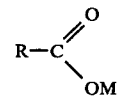

wherein: R is hydrogen or a methyl, ethyl or propyl radical, and M is potassium, the clay stabilizing agent being present in the composition in an amount in the range of from about 1 to about 30 pounds per barrel of composition, and sodium hydroxide present in the composition in an amount sufficient to adjust the pH thereof to a level in the range of from about 8 to about 11.5.

Another preferred weighted composition is as defined above and including barite solid weighting agent present in the composition in an amount in the range of from about 5 to about 600 pounds per barrel and a rheology stabilizing agent comprised of the sodium salt of polymerized alkyl naphthalene sulfonic acid present in the composition in an amount in the range of from about ¼ to about 10 pounds per barrel of composition.

The most preferred composition of the present invention is comprised of water, sepiolite clay viscosity increasing agent present in the composition in an amount of about 10–25 pounds per barrel of composition, vinylamide-vinylsulfonate terpolymer fluid loss reducing and rheology stabilizing agent present in the composition in an amount of about 3–5 pounds per barrel of composition, potassium acetate clay stabilizing agent present in the composition in the amount of about 10 pounds per barrel of composition, sodium hydroxide present in the composition in an amount sufficient to adjust the pH of the composition to 9.5, barite weighting agent present in the composition in an amount sufficient to increase the density thereof to a density in the range of from about 8.5 to about 19 pounds per gallon and a rheology stabilizing agent comprised of the sodium salt of polymerized alkyl naphthalene sulfonic acid present in the composition in an amount of about 0.5 pound per barrel of composition.

In order to facilitate a clear understanding of the compositions of the present invention, the following examples are given.

EXAMPLE 1

Drilling or completion fluid formulations are prepared as follows. Add potassium acetate to seawater and mix to dissolve (about 2 minutes). Add sepiolite clay and mix for 8 minutes to allow the sepiolite to hydrate. Add vinylamide-vinylsulfonate terpolymer, followed by the sodium salt of polymerized alkyl naphthalene sulfonic acid. Adjust the pH of the solution with caustic soda to around 9.0. For a weighted system, add the necessary quantity of barite and mix for another 10 minutes.

The properties of weighted and unweighted fluid formulations prepared in accordance with the above procedure are given in Table I below.

TABLE I

FLUID FORMULATION PROPERTIES

| Sample No. | 1 | | 2 | | 3 | | 4 | | 5 | |
|---|---|---|---|---|---|---|---|---|---|---|
| Conditions | I | HR | I | HR | I | HR | I | HR | I | HR |
| Water, ml. | 350 | | 332 | | 300 | | 279 | | 252 | |
| Sea salt, ppb | 14.7 | | 14.0 | | 12.6 | | 11.0 | | 10.6 | |
| Potassium acetate, ppb | 10.0 | | 9.5 | | 8.6 | | 8.0 | | 7.2 | |
| Sepiolite, ppb | 25.0 | | 22.5 | | 20.0 | | 15.0 | | 12.5 | |
| Terpolymer, ppb | 3.0 | | 3.0 | | 3.0 | | 3.0 | | 3.0 | |
| Sodium hydroxide, ppb | 0.25 | | 0.25 | | 0.25 | | 0.25 | | 0.25 | |
| Alkyl naphthalene Sodium sulfonate, ppb | 0.5 | | 0.5 | | 0.5 | | 0.5 | | 0.5 | |
| Barite, ppb | | | 78 | | 203 | | 299 | | 410 | |
| YP, #/100 ft² | 2 | 3 | 6 | 4 | 2 | 4 | 4 | 2 | 2 | 10 |
| Gels, 1/10 minutes | 2/2 | 2/2 | 2/4 | 2/3 | 2/3 | 1/3 | 2/4 | 2/5 | 4/8 | 4/8 |
| pH | 9.5 | 9.0 | 9.5 | 9.0 | 9.5 | 8.9 | 9.5 | 8.8 | 9.6 | 8.8 |
| API fluid loss, ml. | | 10.6 | | | | | | 8.8 | | |
| Weight, ppg | 8.6 | | 10.0 | | 12.0 | | 14.0 | | 16.0 | |
| mg/l K | 10,000* | | | | 10,175* | | | | 10,450* | |

I = initial
HR = hot rolled 16 hours at 150° F.
*Analysis by atomic absorption

EXAMPLE 2

The fluid formulations shown in Table I and prepared in accordance with the procedure given in Example 1 are tested for tolerance to solids contamination. Grundite shale is used as the solid contaminant. The shale has the following composition:

| α-quartz | 20-22% |
|---|---|
| Pyrite | 3-5% |
| Chlorite | 4-6% |
| Illite | 40-45% |
| Smectite and mixed layer clays | 21-25% |
| Amorphous | 4-6% |

CEC* = 10.6 meq/100 grams shale

| Potassium | 248 mg/l |
|---|---|
| Magnesium | 1250 mg/l |
| Calcium | 2710 mg/l |
| Sodium | 42 mg/l |

The results of the solids contamination tests are summarized in Table II below.

TABLE II

DRILLING OR COMPLETION FLUID FORMULATION TOLERANCE TO DRILL SOLIDS

| Percent Solids (ppb solids) | Fluid Weight, ppg | YP I | YP HR | Gels I | Gels HR |
|---|---|---|---|---|---|
| 0 (0) | 8.6 | 2 | 3 | 2/2 | 2/2 |
| 3 (10.5) | 8.6 | 2 | 0 | 1/2 | 1/1 |
| 6 (21.0) | 8.6 | 2 | 1 | 1/1 | 1/3 |
| 10 (35.0) | 8.6 | 2 | 1 | 0/2 | 1/2 |
| 15 (52.5) | 8.6 | 2 | 4 | 2/4 | 1/3 |
| 0 (0) | 10.0 | 6 | 4 | 2/4 | 2/3 |
| 3 (10.5) | 10.0 | 8 | 4 | 3/4 | 2/3 |
| 6 (21.0) | 10.0 | 4 | 6 | 2/4 | 3/3 |
| 10 (35.0) | 10.0 | 6 | 6 | 2/4 | 2/3 |
| 15 (52.5) | 10.0 | 6 | 4 | 2/6 | 2/5 |
| 0 (0) | 12.0 | 2 | 4 | 2/3 | 1/3 |
| 3 (10.5) | 12.0 | 0 | 4 | 2/3 | 1/4 |
| 6 (21.0) | 12.0 | 2 | 4 | 2/3 | 1/3 |
| 10 (35.0) | 12.0 | 4 | 4 | 2/4 | 2/3 |
| 15 (52.5) | 12.0 | 4 | 4 | 2/5 | 2/6 |
| 0 (0) | 14.0 | 4 | 2 | 2/4 | 2/5 |
| 3 (10.5) | 14.0 | 0 | 2 | 2/3 | 3/5 |
| 6 (21.0) | 14.0 | 3 | 4 | 3/5 | 2/5 |
| 10 (35.0) | 14.0 | 4 | 4 | 2/5 | 2/6 |
| 15 (52.5) | 14.0 | 6 | 4 | 2/6 | 2/7 |
| 20 (70.0) | 14.0 | 10 | 12 | 3/13 | 4/12 |
| 25 (87.5) | 14.0 | 16 | 16 | 4/20 | 5/19 |
| 30 (105) | 14.0 | 22 | 26 | 5/28 | 8/29 |

Up to 70 ppb solids are tolerated by the formulations without significant changes in the rheology even at 14 ppg mud weight. Solids up to 105 ppb added to a 14 ppg fluid increase the yield point and the gels, although the rheological properties are still acceptable. The terpolymer is kept at 3 ppb in all the tests. Increasing the concentration of the vinylamide-vinylsulfonate terpolymer promotes rheological stabilization and higher levels of solids can be tolerated by the fluid formulations.

EXAMPLE 3

Drilling or completion fluids of various weights are formulated in accordance with the procedure of Example 1 and the quantities of components given in Table I, except the concentration of the alkyl naphthalene sodium sulfonate is increased to 5 ppb. The fluids are tested for green cement contamination by adding 3% green cement and 10% drill solids to the fluids. The results are summarized in Table III below.

TABLE III

DRILLING OR COMPLETION FLUID TOLERANCE TO GREEN CEMENT CONTAMINATION

| | Weight, ppg | | | | | | | | | |
|---|---|---|---|---|---|---|---|---|---|---|
| | 8.6 | | 10.0 | | 12.0 | | 14.0 | | 16.0 | |
| | I | HR | I | HR | I | HR | I | HR | I | HR |
| PV, cps | 8 | 10 | 12 | 12 | 19 | 22 | 24 | 25 | 36 | 50 |
| YP, lbs/100 ft$^2$ | 2 | 2 | 2 | 4 | 4 | 10 | 2 | 8 | 12 | 22 |
| Gels, | 2/3 | 1/3 | 2/2 | 2/5 | 2/4 | 4/17 | 2/4 | 4/13 | 4/22 | 17/52 |
| pH | 11.3 | 11.9 | 11.3 | 11.8 | 11.4 | 11.8 | 11.4 | 11.8 | 11.5 | 11.8 |
| API fluid loss,cc | | 19.0 | | 17.5 | | 13.5 | | 12.2 | | |

I = initial
HR = hot-rolled 16 hours at 150° F.

Rheological properties can be improved by the addition of more alkyl naphthalene sodium sulfonate or the vinylamide-vinylsulfonate terpolymer. The latter is more effective. For example, the addition of 2 ppb of the alkyl naphthalene sodium sulfonate to a 16 ppg sample, hot-rolled for 16 hours, decreases the yield point from 22 to 16 and gels from 17/52 to 5/25. On the other hand, the addition of 2 ppb of the terpolymer brings the yield point from 22 to 4 and the gels from 17/52 to ⅔.

EXAMPLE 4

The procedure of Example 3 is repeated except that 5% green cement and 10% drill solids are used. The 5% green cement and 10% drill solids result in higher but still acceptable gels. The fluid formulations are as shown in Table I except the alkyl naphthalene sodium sulfonate level is raised to 6 ppb. The results of these tests are given in Table IV below.

TABLE IV

DRILLING OR COMPLETION FLUID TOLERANCE TO GREEN CEMENT CONTAMINATION

| | Weight, ppg | | | | | | | | | |
|---|---|---|---|---|---|---|---|---|---|---|
| | 8.6 | | 10.0 | | 12.0 | | 14.0 | | 16.0 | |
| | I | HR | I | HR | I | HR | I | HR | I | HR |
| PV, cps | 12 | 11 | 12 | 17 | 19 | 24 | 23 | 26 | 32 | 40 |
| YP, lbs/100 ft$^2$ | 0 | 24 | 2 | 11 | 4 | 20 | 2 | 12 | 10 | 28 |
| Gels, | 2/3 | 23/47 | 2/3 | 5/28 | 2/11 | 14/51 | 2/13 | 5/35 | 5/32 | 15/76 |
| pH | 11.8 | 12.0 | 11.8 | 12.0 | 11.8 | 12.0 | 11.8 | 12.0 | 11.7 | 11.8 |

I = initial
HR = hot-rolled 16 hours at 150° F.

EXAMPLE 5

The temperature stability of water-based drilling or completion fluids is often limited by the polymeric components. The terpolymer used in this system is stable to over 450° F. and is resistant to hydrolysis.

The temperature stability of the 14 ppg fluid shown in Table I is modified to include 5 ppb vinylamide/vinylsulfonate polymer and 1 ppb alkyl naphthalene sodium sulfonate.

| Fluid Properties: | |
|---|---|
| PV, cps | 31 |
| YP, lbs/100 ft$^2$ | 8 |
| Gels | ¾ |
| API fluid loss, cc | 6.6 |
| HTHP filtrate (300° F.), cc | 34.0 |
| pH | 9.5 |

The effect of temperature and pressure on the fluid is determined using a Model 50 Fann consistometer. The fluid becomes thin with higher temperature and pressure and recovers its consistency on cooling as shown in Table V below.

TABLE V

CONSISTOMETER DATA

| Temperature, °F. | Pressure, psi | Consistometer Units* |
|---|---|---|
| 75 | 1,000 | 56 |
| 100 | 2,000 | 44 |
| 150 | 4,000 | 36 |
| 200 | 7,000 | 30 |
| 250 | 8,000 | 26 |
| 300 | 9,000 | 24 |
| 350 | 9,500 | 20 |
| 375 | 9,500 | 20 |
| 400 | 10,000 | 22 |
| 440 | 10,000 | 12 |
| cooled to 75 | | 50 |

*arbitrary units

The rheological properties of the 14 ppg fluid, contaminated with 35 ppb drill solids, remains stable after 16 hours static aging at 350° F. as shown in Table VI below.

TABLE VI

| EFFECT OF TEMPERATURE ON RHEOLOGY | | |
|---|---|---|
| Drilling or Completion Fluid: | 14 ppg | |
| Drill Solids: | 35 ppb | |
| Terpolymer: | 5 ppb | |
| Properties | Initial | Static-Aged |
| PV, cps | 32 | 21 |
| YP, lbs/100 ft$^2$ | 8 | 6 |
| Gels | 2/4 | 2/5 |
| pH | 7.1 | 7.1 |
| API filtrate, cc | | 14.5 |

EXAMPLE 6

Shale stabilization tests are conducted with gumbo shale (containing over 50% smectite) to determine how much potassium is needed for optimum stabilization. Small pieces of gumbo shale are added to unweighted fluids with varying amounts of potassium and hot-rolled for 16 hours at 150° F. The results of these tests are given in Table VII below.

TABLE VII

| | DRILLING AND COMPLETION FLUID SHALE STABILIZATION | | | | | |
|---|---|---|---|---|---|---|
| ppb CH$_3$CO$_2$K | 5 | 10 | 15 | 20 | 25 | 30 |
| ppm K* | 5650 | | 16250 | | | 32250 |
| Wt. of shale, init., grams | 21.43 | 14.67 | 11.48 | 12.51 | 10.32 | 9.46 |
| Wt. of shale, after hot-rolling | 18.17 | 11.08 | 9.64 | 10.02 | 8.22 | 7.92 |
| Wt. loss, grams | 3.26 | 3.59 | 1.84 | 2.49 | 2.10 | 1.54 |
| % loss | 15.21 | 24.47 | 16.03 | 19.90 | 20.45 | 16.28 |

*analysis by atomic absorption

Each shale sample remains in solid form with no cracks. Each sample shows signs of dehydration. The results indicate that even with 5 ppb (less than 1% K), fluids have good clay stabilization properties.

EXAMPLE 7

The fluids of this invention can be prepared in fresh water. Other polymers, such as starch, hydroxyethylcellulose, etc., can be substituted for the terpolymer in low temperature applications. The starch-containing fluids can be converted to high temperature fluids if needed. Examples of fresh water formulations with different polymers are given in Tables VIII and IX below.

TABLE VIII

| | FRESH WATER, UNWEIGHTED FLUIDS | | | | | | | |
|---|---|---|---|---|---|---|---|---|
| | 1 | | 2 | | 3 | | 4 | |
| Additives, ppb | | | | | | | | |
| Potassium acetate | 10.0 | | 10.0 | | 10.0 | | 10.0 | |
| Sepiolite | 15.0 | | 15.0 | | 15.0 | | 15.0 | |
| Starch | 10.0 | | 5.0 | | 7.0 | | 10.0 | |
| Vinylamide-vinylsulfonate terpolymer | | | | | 2.0 | | | |
| Alkyl naphthalene sodium sulfonate | 0.5 | | 0.5 | | 0.5 | | | |
| Hydroxyethylcellulose | | | 2.0 | | | | | |
| Sodium hydroxide | 0.25 | | 0.25 | | 0.25 | | 0.25 | |
| | I | HR | I | HR | I | HR | I | HR |
| AV, cps | 13 | 12 | 8 | 6.5 | 9 | 9 | 8 | 10 |
| PV, cps | 8 | 7 | 8 | 6 | 8 | 8 | 6 | 7 |
| YP, lbs/100 ft$^2$ | 10 | 10 | 0 | 1 | 2 | 2 | 4 | 6 |
| Gels | 4/7 | 4/7 | 0/2 | 0/2 | 0/2 | 1/2 | 2/8 | 2/8 |
| pH | 10.8 | 9.8 | 10.7 | 9.8 | 10.1 | 9.7 | 10.5 | 10.6 |
| API fluid loss, cc | | 6.0 | | 10.6 | | 6.5 | | 6.0 |
| ppm Potassium | 10,000 | | 10,000 | | 10,000 | | 10,000 | |

I = initial
HR = hot-rolled for 16 hours at 150° F.

TABLE IX

| | FRESH WATER, WEIGHTED FLUIDS | | | | | | | |
|---|---|---|---|---|---|---|---|---|
| | 1 | | 2 | | 3 | | 4 | |
| Additives, ppb | | | | | | | | |
| Potassium acetate | 9.5 | | 8.6 | | 8.0 | | 6.5 | |
| Sepiolite | 15.0 | | 15.0 | | 15.0 | | 10.0 | |
| Starch | 10.0 | | 10.0 | | 10.0 | | | |
| Vinylamide-vinylsulfonate terpolymer | | | | | | | 3.0 | |
| Alkyl naphthalene sodium sulfonate | 0.5 | | 0.5 | | 5.0 | | 5.0 | |
| Sodium hydroxide | 0.25 | | 0.25 | | 0.25 | | 0.5 | |
| Barite | 78.0 | | 203.0 | | 299.0 | | 564.0 | |
| | I | HR | I | HR | I | HR | I | HR |
| AV, cps | 12 | 13 | 23 | 28 | 32.5 | 34 | 71 | 66 |
| PV, cps | 9 | 8 | 16 | 12 | 20 | 25 | 50 | 48 |
| YP, lbs/100 ft$^2$ | 6 | 10 | 14 | 32 | 25 | 18 | 42 | 35 |
| Gels | 0/4 | 2/17 | 4/29 | 24/50 | 8/14 | 9/30 | 10/46 | 7/25 |
| pH | | 9.9 | | 9.3 | | 8.5 | | 8.2 |
| API fluid loss, cc | | 5.8 | | 9.6 | | 7.0K | | 5.6 |

TABLE IX-continued

| FRESH WATER, WEIGHTED FLUIDS | | | | |
|---|---|---|---|---|
| Wt. ppg | 10.0 | 12.0 | 14.0 | 18.6 |
| ppm Potassium | 10,000 | 10,000 | 10,000 | 10,000 |

I = initial
HR = hot-rolled for 16 hours at 150° F.

EXAMPLE 8

The fresh water fluids are also tested for tolerance to solids contamination. The results are summarized in Table X below. Formulation 1, with no potassium acetate, gives high yield point and gels. In the presence of potassium acetate (Formulation 2), the yield points and the gels are much lower. This demonstrates that potassium acetate has excellent inhibition on the clays (sepiolite and grundite). Formulation 3 with 70 ppb drill solids shows insignificant changes in rheological properties. The addition of the terpolymer causes further lowering of the yield point and the gels.

TABLE X

| TOLERANCE TO SOLIDS CONTAMINATION, FRESH WATER FLUIDS | | | | | | | | |
|---|---|---|---|---|---|---|---|---|
| | 1 | | 2 | | 3 | | 4 | |
| Additives, ppb | | | | | | | | |
| Potassium acetate | | | 10.0 | | 10.0 | | 10.0 | |
| Sepiolite | 15.0 | | 15.0 | | 15.0 | | 15.0 | |
| Starch | | | | | | | 7.0 | |
| Vinylamide-vinylsulfonate terpolymer | | | | | | | 2.0 | |
| Alkyl naphthalene sodium sulfonate | 0.5 | | 0.5 | | 0.5 | | 0.5 | |
| Sodium hydroxide | 0.25 | | 0.25 | | 0.25 | | 0.25 | |
| Grundite Shale | 35.0 | | 35.0 | | 70.0 | | 70.0 | |
| | I | HR | I | HR | I | HR | I | HR |
| AV, cps | 67 | 53 | 13 | 12 | 14 | 13 | 13 | 12 |
| PV, cps | 28 | 14 | 10 | 9 | 10 | 10 | 12 | 11 |
| YP, lbs/100 ft.$^2$ | 78 | 78 | 6 | 6 | 7 | 5 | 2 | 2 |
| Gels | 16/22 | 38/38 | 3/6 | 3/8 | 3/10 | 3/7 | 2/2 | 2/2 |
| ppm Potassium | 0.0 | | 10,000 | | 10,000 | | 10,000 | |

I = initial
HR = hot-rolled for 16 hours at 150° F.

EXAMPLE 9

Fresh Water fluids are prepared containing 10,000 ppm K using potassium chloride and potassium acetate. Pieces of gumbo shale with over 50% smectite are immersed in the fluids and hot-rolled for 16 hours at 150° F. The potassium acetate demonstrates better shale stabilization qualities.

| | Data: | |
|---|---|---|
| (1) | KCl fluid | |
| | Wt. of gumbo shale | 7.45 grams |
| | After 16 hrs., 150° F. hot-rolling | 6.00 grams |
| | Weight loss | 1.45 grams |
| | % weight loss | 19.45% |
| (2) | CH$_3$CO$_2$K fluid | |
| | Weight of gumbo shale | 7.45 grams |
| | After 16 hrs., 150° F. hot-rolling | 6.48 grams |
| | Weight loss | 0.97 grams |
| | % weight loss | 13.02% |

EXAMPLE 10

Corrosion is a problem with potassium chloride solutions which are much below saturation levels. The potassium acetate fluid is tested for corrosion properties.

Solutions of potassium chloride and potassium acetate are prepared containing 10,000 ppm K. Corrosion tests are run for 167 hours at 150° F. With the KCl fluid, the corrosion rate is 13 mils per year while with the potassium acetate fluid, the corrosion rate is 3.6 mils per year, a fourfold improvement.

EXAMPLE 11

Aqueous solutions (fresh water) of potassium acetate, potassium formate, ammonium formate, ammonium acetate and rubidium acetate are prepared containing 10,000 ppm of cation. Pieces of gumbo shale with over 50% smectite are immersed in the solutions and hot-rolled for 16 hours at 150° F. For comparison purposes pieces of the same gumbo shale are hot-rolled for the same time and temperature in fresh water alone and in a fresh water solution of potassium citrate. The results of these tests are given in Table III below.

TABLE XI

| SHALE STABILIZATION BY VARIOUS ORGANIC ACID SALTS | | | | | |
|---|---|---|---|---|---|
| Organic Acid Salt Used | Initial Gumbo Shale Weight, gms. | Weight of Gumbo Shale After Hot Rolling, gms. | Weight Loss, gms. | % Loss | pH of Solution |
| None | 8.83 | 0 (Shale Disintegrated) | 8.83 | 100 | 7.2 |
| Potassium Acetate | 5.42 | 4.47 | 0.95 | 17.53 | 8.4 |
| Potassium Formate | 7.55 | 6.80 | 0.75 | 9.93 | 7.8 |
| Ammonium Formate | 8.79 | 8.40 | 0.39 | 4.44 | 7.8 |
| Ammonium Acetate | 7.62 | 7.45 | 0.17 | 2.23 | 7.9 |
| Rubidium Acetate | 4.39 | 4.17 | 0.22 | 5.01 | 8.0 |
| Potassium Citrate | 8.39 | 5.43 | 2.96 | 35.28 | 9.5 |

From Table III it can be seen that the various organic acid salts utilized in accordance with the present invention provide excellent shale stabilization.

We claim:

1. A well drilling and completion fluid composition consisting essentially of:

water;

sepiolite clay viscosity increasing agent present in said composition in an amount in the range of from about 1 to about 50 pounds per barrel of composition;

vinylamide-vinylsulfonate terpolymer fluid loss reducing and rheology stabilizing agent present in said composition in an amount in the range of from about 1 to about 30 pounds per barrel of composition, said terpolymer being prepared by the reaction of 2-acrylamide-2 methyl-3-propyl sodium sulfonate, vinylacetamide and acrylamide monomers;

sodium hydroxide present in said composition in an amount in the range of from about 1/8 to about 2 pounds per barrel of composition; and potassium acetate clay stabilizing agent present in said composition in an amount in the range of from about 1 to about 100 pounds per barrel of composition.

2. The composition of claim 1 which is further characterized to include a solid weighting agent present in said composition in a quantity sufficient to increase the density thereof to a level in the range of from about 8.5 to about 19 pounds per gallon of composition.

* * * * *